US012366214B1

(12) United States Patent
Firsich et al.

(10) Patent No.: US 12,366,214 B1
(45) Date of Patent: Jul. 22, 2025

(54) SYSTEM AND METHOD FOR COMPENSATING FUEL MASS BASED ON OIL DILUTION

(71) Applicant: FCA US LLC, Auburn Hills, MI (US)

(72) Inventors: Nicholas Firsich, Clarkston, MI (US); David Pedro, Techumseh (CA); William B Attard, Brighton, MI (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 18/624,499

(22) Filed: Apr. 2, 2024

(51) Int. Cl.
*F02D 41/04* (2006.01)

(52) U.S. Cl.
CPC .... *F02D 41/047* (2013.01); *F02D 2200/0625* (2013.01); *F02D 2200/0814* (2013.01); *F02D 2250/11* (2013.01)

(58) Field of Classification Search
CPC ............. F02D 41/0007; F02D 41/0027; F02D 41/0052; F02D 41/0077; F02D 41/04; F02D 41/047; F02D 41/062; F02D 41/1448; F02D 29/02; F02D 2200/70; F02D 2200/021; F02D 2200/023; F02D 2200/0402; F02D 2200/0625; F02D 2200/0814; F02D 2250/08; F02D 2250/11; F02B 43/10; F02B 37/183; F01M 13/0011; F01M 13/028; F01M 13/04; F02M 35/10222; F02M 25/06; F01N 3/105; F01N 3/243; F01N 3/06; Y02T 10/12
See application file for complete search history.

(56) References Cited

U.S. PATENT DOCUMENTS

| | | | | |
|---|---|---|---|---|
| 9,726,067 | B2 * | 8/2017 | Hakeem | F01P 7/10 |
| 2006/0272626 | A1 * | 12/2006 | Roberts | F02M 25/06 123/573 |
| 2011/0023852 | A1 * | 2/2011 | Yamashita | F01M 13/00 123/574 |
| 2016/0369718 | A1 * | 12/2016 | Pursifull | F02D 41/0007 |
| 2019/0093583 | A1 * | 3/2019 | Miyamoto | F02D 41/2454 |
| 2020/0291884 | A1 * | 9/2020 | Zhang | F02D 41/0007 |
| 2021/0164410 | A1 * | 6/2021 | Nakamura | F02D 41/062 |
| 2023/0313750 | A1 * | 10/2023 | Li | F01M 13/0011 123/41.86 |

OTHER PUBLICATIONS

"Why Does My Engine Oil Smell Like Gas?", Mechanic Base, Feb. 17, 2023—https://mechanicbase.com/engine-oil/oil-smells-like-gas/, retrieved from the Internet on Mar. 28, 2024.
DOE Merit Review—Flex Fuel Vehicle Systems—Bosch, Jan. 24, 2008.
Jeep 2021 Wrangler 4xe Hybrid Supplement Owner's Manual.

* cited by examiner

*Primary Examiner* — Logan M Kraft
*Assistant Examiner* — Johnny H Hoang
(74) *Attorney, Agent, or Firm* — Jeremy J. Klobucar

(57) ABSTRACT

A control system for controlling fuel delivery to an internal combustion engine (ICE) based on oil diluted by fuel in a crankcase of the ICE includes a fuel injector and a controller. The controller is configured to determine a modeled evaporation rate of unburned fuel in the crankcase; compare the modeled evaporation rate of unburned fuel to a threshold; and communicate a fuel delivery signal indicative of an injector fuel mass target to the fuel injector to compensate the fuel injected based on the modeled evaporation rate of the unburned fuel in the crankcase exceeding the threshold.

16 Claims, 3 Drawing Sheets

SYSTEM AND METHOD FOR COMPENSATING FUEL MASS BASED ON OIL DILUTION

FIELD

The present application relates to determining air-fuel ratio for an internal combustion engine and, more particularly, to techniques for maintaining a desired air-fuel ratio by proactively compensating fuel injection based on diluted oil in the crankcase.

BACKGROUND

As is known, internal combustion engines require a mixture of fuel and air for accurate combustion. During combustion it is desirable to provide accurate proportions of fuel and air to maintain optimal engine performance efficiency and exhaust concentrations. In some instances, engine oil can become diluted by fuel due to, for example, worn piston rings. As such, unburned fuel can be mixed with engine oil in the engine crankcase. Once fuel has diluted the engine oil in the oil pan, it has the potential to evaporate from the oil once the engine is sufficiently warm. The fuel vapors that evaporate from the oil can go from the oil to the intake manifold such as by way of the positive crankshaft ventilation system (PCV) or a make-up air (MUA) hose. Once the evaporated fuel is inducted into the intake manifold, it can be introduced to the cylinders to be burned with the normal air-fuel charge. Since the engine control unit (ECU) does not account for this extra fuel, an excess amount of fuel will take place in the combustion process causing an undesirable "rich" condition. Accordingly, a need exists in the art to improve upon efficiencies of engine control systems to account for oil dilution conditions.

SUMMARY

According to one example aspect of the disclosure, a control system for controlling fuel delivery to an internal combustion engine (ICE) based on oil diluted by fuel in a crankcase of the ICE includes a fuel injector and a controller. The controller is configured to determine a modeled evaporation rate of unburned fuel in the crankcase; compare the modeled evaporation rate of unburned fuel to a threshold; and communicate a fuel delivery signal indicative of an injector fuel mass target to the fuel injector to compensate the fuel injected based on the modeled evaporation rate of the unburned fuel in the crankcase exceeding the threshold.

In some implementations, the controller is further configured to: determine a modeled flow rate of a positive crankshaft ventilation system (PCV) of the internal combustion engine; and determine an estimated fuel concentration that is flowing back to an intake manifold through the PCV based on the modeled flow rate of the PCV and the modeled evaporation rate of unburned fuel.

In other implementations, the controller is further configured to: receive an oxygen signal from an oxygen sensor disposed in an exhaust system of the ICE; determine a short term fuel trim indicative of a fuel correction required to achieve stoichiometry based on the oxygen signal; and determine an adaption factor indicative of a modified fuel amount that satisfies the fuel correction.

In additional implementations, the controller is further configured to: determine an adapted concentration based on the estimated fuel concentration and the adaption factor.

In other examples, the controller is further configured to: determine a final fuel mass compensation based on the adaption concentration and the modeled PCV flow rate.

In additional examples, the controller is further configured to communicate the fuel delivery signal indicative of an injector fuel mass target based on the final fuel mass compensation and a required fuel mass.

In additional examples, the modeled flow rate of the PCV is from a calibrated model based on a pressure in the intake manifold and a pressure in the crankcase.

In other examples, the modeled flow rate of the PCV is determined in a lookup table based on a difference of the pressure in the intake manifold and a pressure in the crankcase.

According to another example aspect of the disclosure, a method for controlling fuel delivery with a fuel injector that delivers an amount of fuel to a combustion chamber of an internal combustion engine (ICE) based on oil diluted by fuel in a crankcase of the ICE is provided. The method includes: determining a modeled evaporation rate of unburned fuel in the crankcase; comparing the modeled evaporation rate of unburned fuel to a threshold; and communicating a fuel delivery signal indicative of an injector fuel mass target to the fuel injector to compensate the fuel injected based on the modeled evaporation rate of the unburned fuel in the crankcase exceeding the threshold.

In some implementations, the method includes determining a modeled flow rate of a positive crankshaft ventilation system (PCV) of the internal combustion engine; and determining an estimated fuel concentration that is flowing back to an intake manifold through the PCV based on the modeled flow rate of the PCV and the modeled evaporation rate of unburned fuel.

In some implementations, the method includes receiving an oxygen signal from an oxygen sensor disposed in an exhaust system of the ICE; determining a short term fuel trim indicative of a fuel correction required to achieve stoichiometry based on the oxygen signal; and determining an adaption factor indicative of a modified fuel amount that satisfies the fuel correction.

In other implementations, the method includes determining an adapted concentration based on the estimated fuel concentration and the adaption factor.

In additional implementations, the method includes determining a final fuel mass compensation based on the adaption concentration and the modeled PCV flow rate.

In additional implementations, the method includes communicating the fuel delivery signal indicative of an injector fuel mass target based on the final fuel mass compensation and a required fuel mass.

In additional implementations, the modeled flow rate of the PCV is from a calibrated model that is based on a pressure in the intake manifold and a pressure in the crankcase.

In other examples, the modeled flow rate of the PCV is determined in a lookup table based on a difference of the pressure in the intake manifold and a pressure in the crankcase.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure is directed toward techniques for maintaining a desired air-fuel ratio by proactively compensating fuel injection based on diluted oil in the crankcase. As discussed above, in some instances, engine oil can become diluted by fuel due to, for example, worn piston rings. As such, unburned fuel can be mixed with engine oil in the engine crankcase. Once fuel has diluted the engine oil in the oil pan, it has the potential to evaporate from the oil once the engine is sufficiently warm. The fuel vapors that evaporate from the oil can go from the oil to the intake manifold such as by way of the positive crankshaft ventilation system (PCV) or a make-up air (MUA) hose. Once the evaporated fuel is inducted into the intake manifold, it can be introduced to the cylinders to be burned with the normal air-fuel charge. Since the engine control unit (ECU) does not account for this extra fuel, an excess amount of fuel will take place in the combustion process causing an undesirable "rich" condition. This "rich" condition can be inferred by the air-fuel measurements taken by the oxygen sensors in the exhaust. The ECU will recognize this "rich" condition and subsequently inject less fuel to adjust the measured exhaust air-fuel ratio back to its target. If the evaporation rate is high enough, the ECU can misinterpret the excess richness as a fuel system malfunction and trigger a message on a human machine interface (HMI) such as a check engine light to be illuminated.

The present disclosure provides a system and method that proactively compensates fuel injection based on diluted oil in the crankcase for maintaining a more desirable and accurate air-fuel ratio. In examples, the ECU implements a control strategy that nominally compensates the fuel injection for fuel that is evaporating from diluted oil in the crankcase and making its way to the intake manifold. The control strategy determines when the mass of fuel evaporating from the crankcase is high enough to require proactive compensation to the fuel injection to prevent air-fuel ratio errors from showing up in oxygen sensor measurements.

Figure 1:
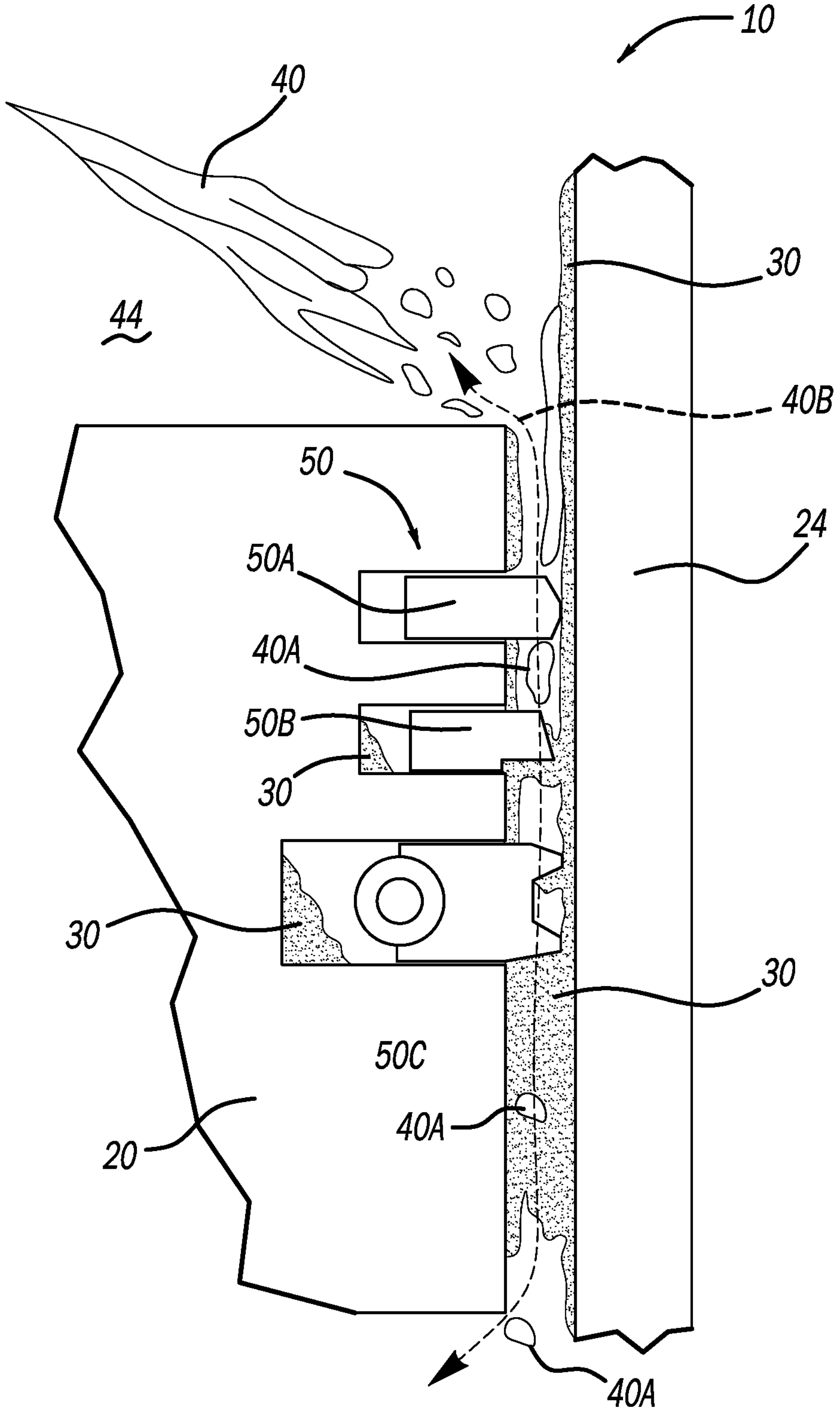
FIG. 1 is a partial cutaway view of an exemplary engine block illustrating a piston traversing along a cylinder wall according to the principles of the present disclosure.
Figure 2:
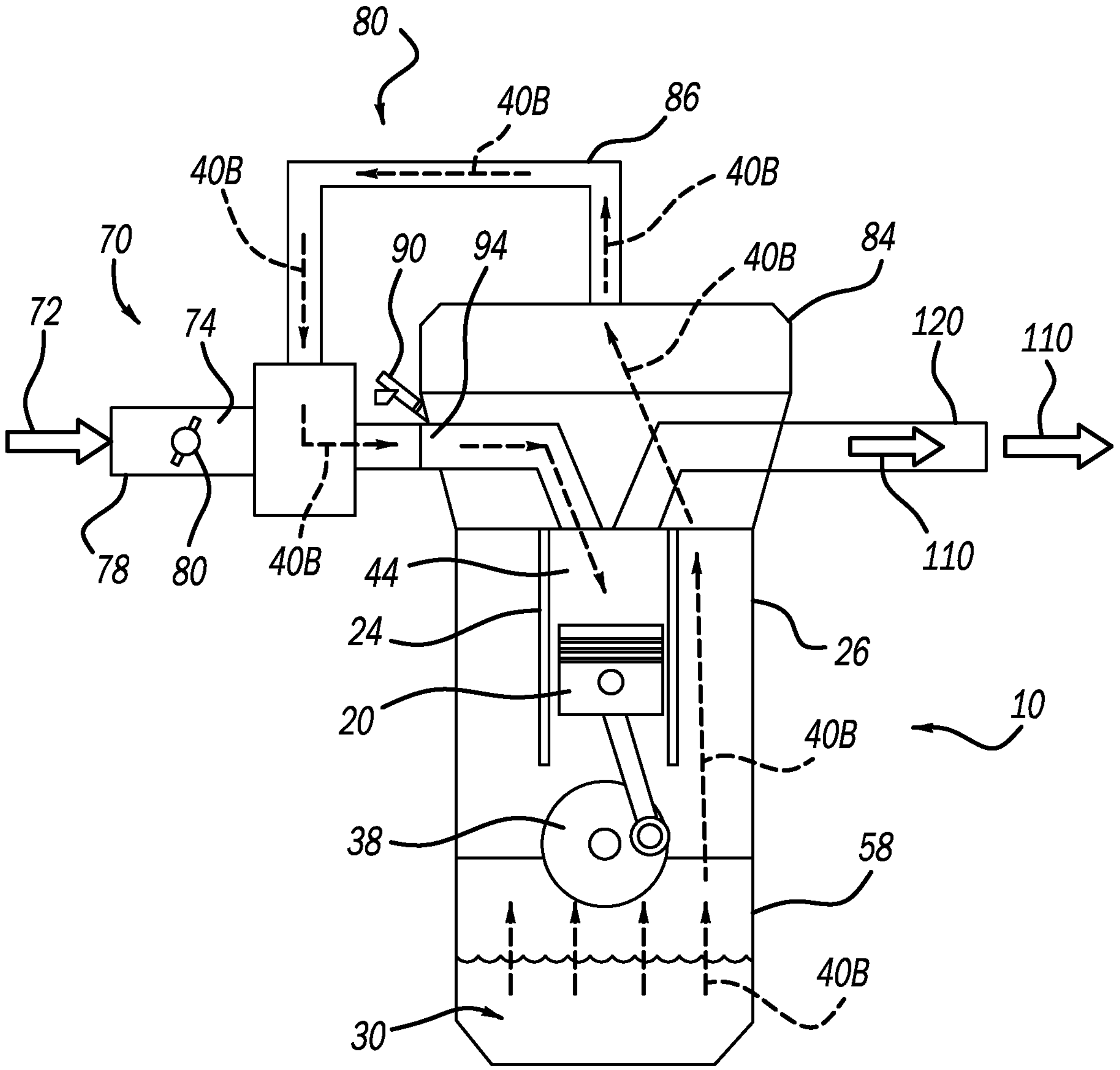
FIG. 2 is a schematic representation of an exemplary combustion event in the engine block at the piston of FIG. 1 illustrating fuel that has undesirably entered the oil pan evaporating from oil into the PCV tube and flowing to the intake manifold according to examples of the present disclosure.

Referring now to FIGS. 1 and 2, a diagram of an exemplary engine 10 illustrating a piston 20 traversing along a cylinder wall 24 defined in a crankcase 26 is shown. While one piston 20 is shown, it is appreciated that an engine 10 may have more pistons 20 disposed in the crankcase 26 that cooperatively reciprocate within the engine 10 for rotating a crankshaft 38. Engine oil 30 is disposed in the engine 10 for lubricating moving components such as the piston(s) 20 that traverse along the cylinder wall 24. Fuel 40 is injected into a combustion chamber 44 defined in the cylinder wall 24.

Piston rings, collectively identified at 50 and individually identified at 50A, 50B and 50C are disposed around the piston 20. The piston rings 50 function to facilitate proper slidable cooperation of the piston 20 along the cylinder wall 24. Ideally, the piston rings 50 are properly lubricated by the oil 30 to further facilitate smooth functionality during reciprocation of the piston 20. Furthermore, the piston rings 50 can act to maintain fuel 40 in the combustion chamber 44 and inhibit the unburned fuel, identified at 40A from flowing past the piston rings 50 and into an oil pan 58 of the engine 10. In some instances, such as when the piston rings 50 have wear, the unburned fuel 40A can undesirably make its way into the oil pan 58 causing oil dilution.

As identified above, fuel dilution can be defined as unburned fuel 40A being mixed with the engine oil 30 in the engine crankcase 26. Excessive oil dilution can have negative effects such as, but not limited to, emissions increase, irregular idle speed, fuel system rich diagnosis false alarm, engine oil overflow, aftertreatment damage, oil viscosity loss leading to engine damage. Oil dilution is more likely to occur with cold ambient temperature, direct injection, and/or low oil temperatures.

The engine 10 is configured to combust an air/fuel mixture to generate drive torque. The engine 10 includes an intake system 70 that draws fresh air 72 into an intake manifold (IM) 74 through an air filter (not shown) and an induction passage 78. A throttle valve 80 regulates a flow of air through the induction passage 78. A positive crankshaft ventilation system (PCV) 80 arranged at a valve cover 84 can introduce filtered fresh air into the crankcase 26. The PCV system 80 can include a PCV tube 86 (and a valve, not shown). The PCV system 80 can use the engine's vacuum to pull the air through the crankcase 26 and reintroduce it back to the intake manifold 74.

The inducted air 72 is distributed to a plurality of cylinders 24 and combined with fuel 40 (e.g., from respective direct-injection or port-injection fuel injectors 90) to form an air/fuel mixture 94. Further, the engine 10 can be configured with additional features such as, but not limited to, a turbocharger and/or supercharger within the scope of the present disclosure. The air/fuel mixture 94 is compressed by the pistons 20 within the cylinders 24 and combusted (e.g., via spark from respective spark plugs) to drive the pistons 20, which turn the crankshaft 38 to generate drive torque. The drive torque is then transferred to a driveline (not shown) of the vehicle 10, e.g., via a transmission (not shown). Exhaust gas 110 resulting from combustion is expelled from the cylinders 24 and into an exhaust manifold (EM) 120 of the engine 10. The exhaust gas 110 from the exhaust manifold 120 is provided to an exhaust system (not shown) where it is fed through a main catalyst (not shown) prior to being expelled into the atmosphere (e.g., through a vehicle tailpipe).

With continued reference to FIGS. 1 and 2, and additional reference to FIG. 3, a fuel dilution condition will be described. Unburned fuel 40A flows past the piston rings 50 and into the oil pan 58 of the engine 10. The unburned fuel 40A undesirable dilutes the oil 30 in the oil pan 58. In examples, the fuel can evaporate, identified at 40B, from the oil 30 and travel to the intake manifold 74 such as through the PCV tube 86. Once the evaporated fuel 40B is inducted into the intake manifold 74, it is introduced to the cylinders 24 to be burned with the normal air-fuel charge.

A control system 200 includes a controller or ECU 210 that controls delivery of the fuel and therefore the air-fuel ratio of the engine 10. The control system 200 maintains a desired air-fuel ratio by proactively compensating fuel injection based on diluted oil in the crankcase 26. As noted above, in prior art control methods, because the ECU would not account for the extra fuel 40B, an excess amount of fuel exists in the combustion process causing the "rich" (e.g., too much fuel) condition.

Figure 3:
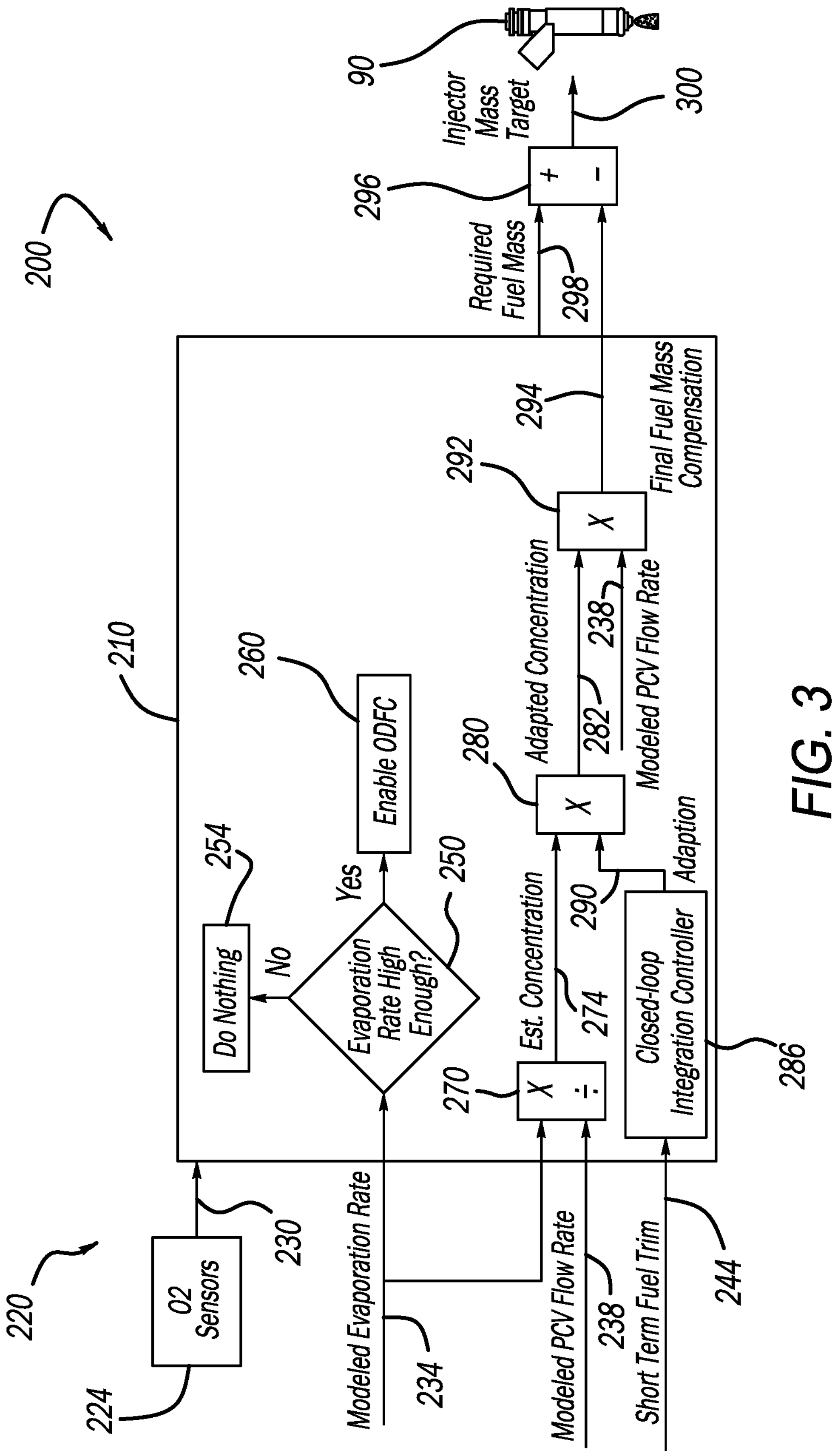
FIG. 3 is an exemplary logic flow diagram illustrating a method for implementing a control strategy for maintaining a desired air-fuel ratio by proactively compensating fuel injection based on diluted oil in the crankcase according to examples of the present disclosure.

With particular reference to FIG. 3, an exemplary logic flow diagram illustrating a method 220 for implementing a control strategy for maintaining a desired air-fuel ratio by proactively compensating fuel injection based on diluted oil in the crankcase 26 according to examples of the present disclosure is shown. In examples, the controller 210 implements a control strategy that nominally compensates the fuel injection for fuel that is evaporating from diluted oil in the crankcase and making its way to the intake manifold 74. The control strategy determines when the mass of fuel evaporating from the crankcase 26 is high enough to require proactive compensation to the fuel injection to prevent air-fuel ratio errors from showing up in oxygen sensor measurements.

The control strategy uses a modeled evaporation rate and a modeled PCV rate from calibrated models within the controller 210 to calculate the concentration of fuel in the gases flowing from the crankcase 26 to the intake manifold 74 via the PCV system 80. While the control strategy is active, if oxygen sensors 224 measure an air-fuel ratio error, an adaption will be learned and applied to the calculated concentration of fuel in the PCV gases. This concentration will be re-multiplied by the PCV mass flow rate to determine the final fuel mass to compensate the fuel injection.

The controller 210 receives a signal 230 from the oxygen sensors 224 indicative of an oxygen content in the exhaust. The controller 210 determines a modeled evaporation rate 234. In examples, the controller 210 can determine the modeled evaporation rate 234 from a calibrated model in the controller 210 that measures a predicted amount of fuel 40A that goes into the oil 30. The controller 210 determines a modeled PCV flow rate 238 from a calibrated model within the controller 210. In examples, the controller 210 can determine the modeled PCV flow rate 238 from a calibrated model in the controller 210 that is based on a pressure in the intake manifold 74 and a pressure in the crankcase 26. A difference between the pressures can be used in a lookup table to determine the modeled PCV flow rate 238. Other strategies may be used.

The controller 210 determines a short term fuel trim 244. The short term fuel trim 244 can be defined as a fuel correction that the controller 210 is commanding the fuel injectors 90 to satisfy the feedback from the oxygen sensors 224 to achieve stoichiometry. At 250 control determines whether the evaporation rate is high enough (exceeds a predetermined threshold that would adversely affect a fuel commanded by the controller 210) based on the modeled evaporation rate 234. If control determines that the evaporation rate has not exceeded a threshold, control ends at 254. If control determines that the evaporation rate has exceeded a threshold, control enables oil dilution fuel compensation control (ODFC) 260

The controller 210 includes a fuel concentration determination module 270 that determines an amount of fuel concentration 274 that is in the gas travelling through the PCV tube 86 and making its way to the intake manifold 74. In examples, the fuel concentration determination module 270 divides the modeled evaporation rate 234 by the modeled PCV flow rate 238 to determine the fuel concentration 274.

The controller 210 includes an adapted concentration module 280 that determines an adapted concentration 282. In practice, a rate of change in the amount of fuel concentration 274 is relatively stable and will not change quickly over time. The controller 210 further includes a closed-loop integration controller 286 that outputs an adaption factor 290 based on the short term fuel trim signal 244. The closed-loop integration controller 286 outputs the adaption factor 290 to deliver less fuel when a rich condition is observed or more fuel with a lean condition is observed.

The short term fuel trim 244 is indicative of the error in fuel amount delivery. In examples the short term fuel trim 244 can be based on signals 230 from the oxygen sensors 224. In order to slowly adjust to what the ODFC 260 has determined the air-fuel ratio should be, the adapted concentration module 280 considers both (multiplies) the estimated concentration 274 and the adaption factor 290 to determine the adapted concentration 282. Ideally, the adapted concentration 282 matches what the actual concentration of fuel is. A final fuel mass compensation module 292 determines a final fuel mass compensation 294 based on (e.g., a product of) the adapted concentration 282 and the modeled PCV flow rate 238. A final fuel mass module 296 determines an injector target 300 and commands a signal to the fuel injector 90 based on (e.g., a difference between) the final fuel mass compensation 294 and a required fuel mass 298.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for controlling fuel delivery to an internal combustion engine (ICE) based on oil diluted by fuel in a crankcase of the ICE, the control system comprising:

a fuel injector that delivers an amount of fuel as fuel injected to a combustion chamber of the internal combustion engine;

a controller configured to:

determine a modeled evaporation rate of unburned fuel in the crankcase;

compare the modeled evaporation rate of unburned fuel to a threshold; and communicate a fuel delivery signal indicative of an injector fuel mass target to the fuel injector to compensate and therefore alter an amount of fuel injected into the combustion chamber based on the modeled evaporation rate of the unburned fuel in the crankcase exceeding the threshold.

2. The control system of claim 1, wherein the controller is further configured to:

determine a modeled flow rate of a positive crankshaft ventilation system (PCV) of the internal combustion engine; and determine an estimated fuel concentration that is flowing back to an intake manifold through the PCV based on the modeled flow rate of the PCV and the modeled evaporation rate of unburned fuel.

3. The control system of claim 2, wherein the controller is further configured to:

receive an oxygen signal from an oxygen sensor disposed in an exhaust system of the ICE;

determine a short term fuel trim indicative of a fuel correction required to achieve stoichiometry based on the oxygen signal; and determine an adaption factor indicative of a modified fuel amount that satisfies the fuel correction.

4. The control system of claim 3, wherein the controller is further configured to:

determine an adapted concentration based on the estimated fuel concentration and the adaption factor.

5. The control system of claim 4, wherein the controller is further configured to:

determine a final fuel mass compensation based on the adaption concentration and the modeled PCV flow rate.

6. The control system of claim 5, wherein the controller is further configured to communicate the fuel delivery signal indicative of an injector fuel mass target based on the final fuel mass compensation and a required fuel mass.

7. The control system of claim 2, wherein the modeled flow rate of the PCV is from a calibrated model based on a pressure in the intake manifold and a pressure in the crankcase.

8. The control system of claim 7, wherein the modeled flow rate of the PCV is determined in a lookup table based on a difference of the pressure in the intake manifold and a pressure in the crankcase.

9. A method for controlling fuel delivery with a fuel injector that delivers an amount of fuel to a combustion chamber of an internal combustion engine (ICE) based on oil diluted by fuel in a crankcase of the ICE, the method comprising:

determining a modeled evaporation rate of unburned fuel in the crankcase;

comparing the modeled evaporation rate of unburned fuel to a threshold; and communicating a fuel delivery signal indicative of an injector fuel mass target to the fuel injector to compensate and therefore alter an amount of fuel injected into the combustion chamber based on the modeled evaporation rate of the unburned fuel in the crankcase exceeding the threshold.

10. The method of claim 9, further comprising:

determining a modeled flow rate of a positive crankshaft ventilation system (PCV) of the internal combustion engine; and determining an estimated fuel concentration that is flowing back to an intake manifold through the PCV based on the modeled flow rate of the PCV and the modeled evaporation rate of unburned fuel.

11. The method of claim 10, further comprising:

receiving an oxygen signal from an oxygen sensor disposed in an exhaust system of the ICE;

determining a short term fuel trim indicative of a fuel correction required to achieve stoichiometry based on the oxygen signal; and determining an adaption factor indicative of a modified fuel amount that satisfies the fuel correction.

12. The method of claim 11, further comprising:

determining an adapted concentration based on the estimated fuel concentration and the adaption factor.

13. The method of claim 12, further comprising:

determining a final fuel mass compensation based on the adaption concentration and the modeled PCV flow rate.

14. The method of claim 13, further comprising:

communicating the fuel delivery signal indicative of an injector fuel mass target based on the final fuel mass compensation and a required fuel mass.

15. The method of claim 10, wherein the modeled flow rate of the PCV is from a calibrated model that is based on a pressure in the intake manifold and a pressure in the crankcase.

16. The method of claim 15, wherein the modeled flow rate of the PCV is determined in a lookup table based on a difference of the pressure in the intake manifold and a pressure in the crankcase.

* * * * *